July 16, 1968 M. S. MACRANDER 3,393,303

MULTIPLYING ARRANGEMENT

Filed Nov. 16, 1965 6 Sheets-Sheet 1

INVENTOR.

MAX S. MACRANDER

BY C. A. Gulbrandsen

ATTY.

July 16, 1968 M. S. MACRANDER 3,393,303

MULTIPLYING ARRANGEMENT

Filed Nov. 16, 1965 6 Sheets-Sheet 2

July 16, 1968 M. S. MACRANDER 3,393,303

MULTIPLYING ARRANGEMENT

Filed Nov. 16, 1965 6 Sheets-Sheet 3

July 16, 1968 M. S. MACRANDER 3,393,303

MULTIPLYING ARRANGEMENT

Filed Nov. 16, 1965 6 Sheets-Sheet 4

MULTIPLYING ARRANGEMENT

Filed Nov. 16, 1965 6 Sheets-Sheet 5

3,393,303

MULTIPLYING ARRANGEMENT

Max S. Macrander, Wheaton, Ill., assignor to Automatic Electric Laboratories, Inc., Northlake, Ill., a corporation of Delaware Filed Nov. 16, 1965, Ser. No. 508,119
7 Claims. (Cl. 235—160)

ABSTRACT OF THE DISCLOSURE

In apparatus for multiplying numbers by the left-hand and right-hand components method, the multiplication components of each digit of a group of digits are stored by windings which selectively thread apertures of a separate myriapertured bistable magnetic disc. Each digit of a mutiplicand is defined with respect to all digits of the group by all of its multiplication components which are stored on a disc and each digit of a multiplier is defined by a separate land area of each disc; therefore, the selection of a disc and the multiplication components stored at a certain land area thereof provides all the components of a specific multiplicand, with respect to a specific multiplier, to an arithmetic unit for processing.

This invention relates to apparatus for multiplying numbers and in particular to arrangements including multiaperture bistable storage devices for providing to arithmetic apparatus all possible multiplication components of any digit of a given group of digits.

In his book "Digital Computer Design Fundamentals," (McGraw-Hill, New York, 1962), Yoahan Chu describes a method of multiplication wherein all possible right-hand and left-hand components of a group of digits are implemented in a table. Multiplication is accomplished in $n$ circuit times, where $n$ is the number of multiplier digits. This method of multication may be extended to radices other than decimal. This table look-up method of multiplication requires repeated accessing of the table memory locations to obtain the right-hand and left-hand component pairs. It is objectionable to store these pairs in the main memory since accessing equipment is employed during the multiplication process, and input-output operations cannot be performed during multiplication. Furthermore, when the table is stored in the main memory, component look-up must be done serially starting with the least significant multiplicand digit, which involves $m \times n$ accesses, where $m$ is the number of multiplicand digits and $n$ is the number of multiplier digits.

In contrast to the above, the present invention provides techniques which permit multiplication by the right-hand and left-hand components method wherein all component pairs of a multiplicand are produced simultaneously and multiplication involves only as many accesses as there are digits in the multiplier.

A primary object of the invention is to provide new improved multiplying techniques.

It is a further object of the invention to provide new and improved multiplier apparatus which simultaneously produces all possible left-hand and right-hand multiplication components of a multiplicand, thus reducing multiplication time.

Yet another object of the invention is to provide, through the utilization of the left-hand and right-hand components multiplication techniques, apparatus which requires fewer addition and shift operations to perform than heretofore known.

One feature of the invention resides in the use of myriaperture bistable magnetic discs to generate on encoding windings thereof all multiplication components of a multiplicand digit. Further, certain ones of said components are registered for arithmetic manipulation by the utilization of apparatus for coupling said certain ones of said components to arithmetic apparatus in accordance with the multiplier digit.

Other objects and features of the invention will become apparent and the invention will be best understood from the following description with reference to the accompanying drawings.

Figure 1:
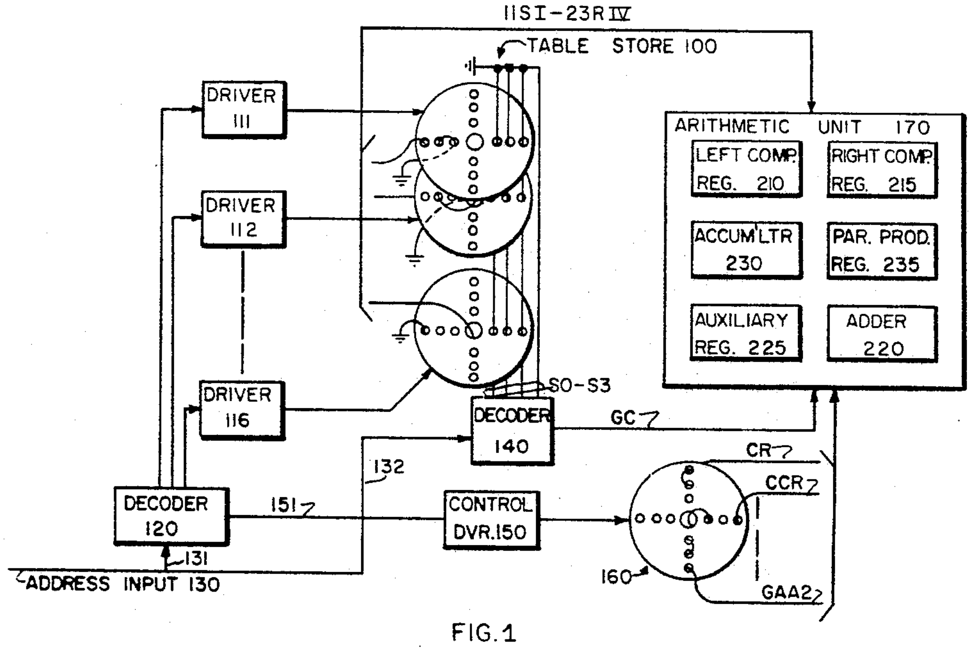
FIG. 1 is a schematic representation of an embodiment of the invention.
Figure 4:
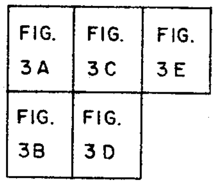

FIGS. 3A–3E provide a more detailed description of the apparatus according to FIG. 1;

FIG. 4 shows the proper orientation of FIGS. 3A–3E; and

Figure 5:
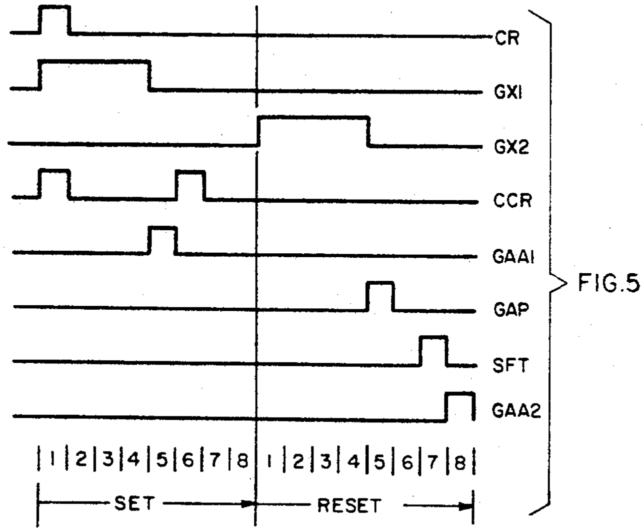
Figure 3A:
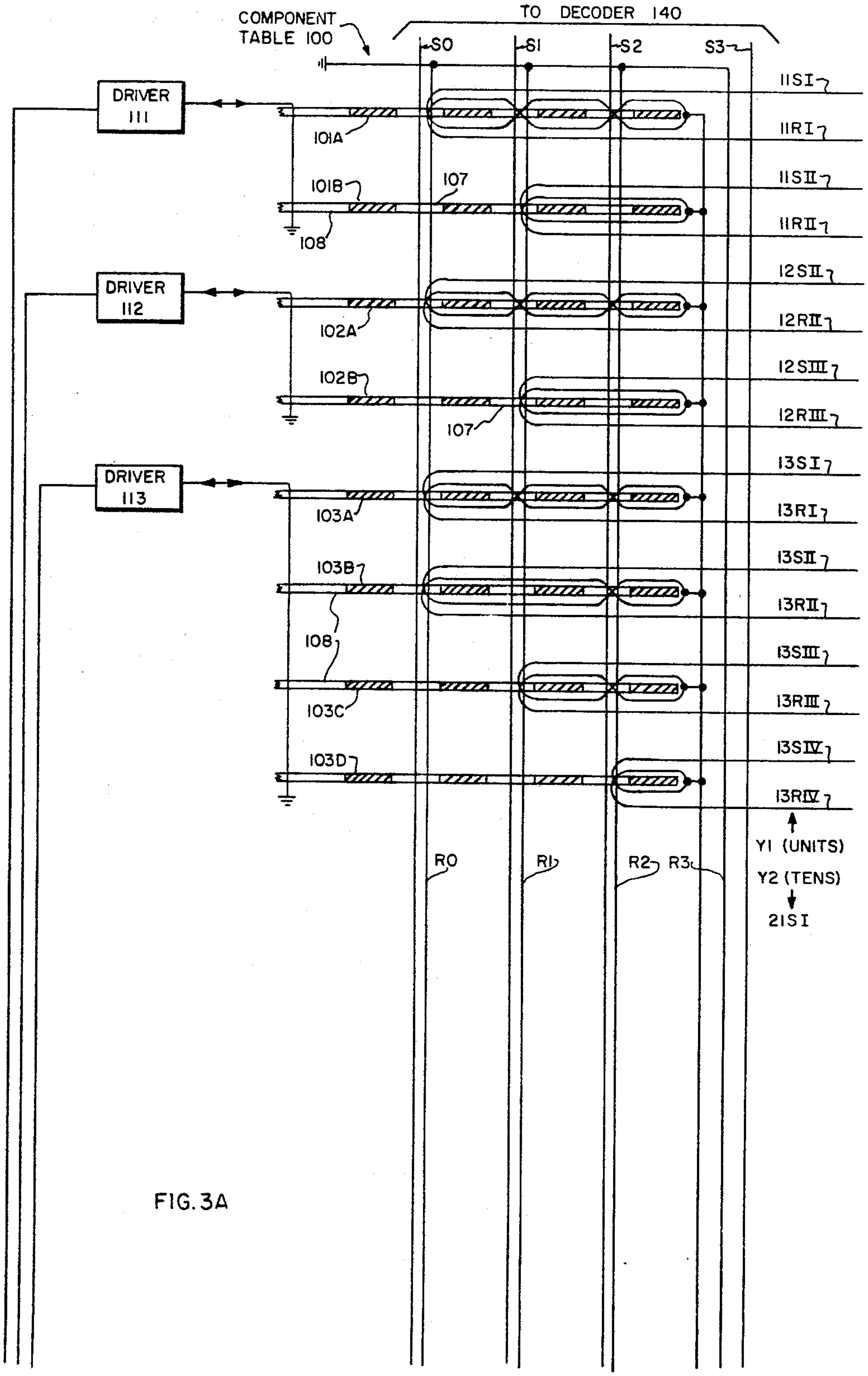
Figure 3B:
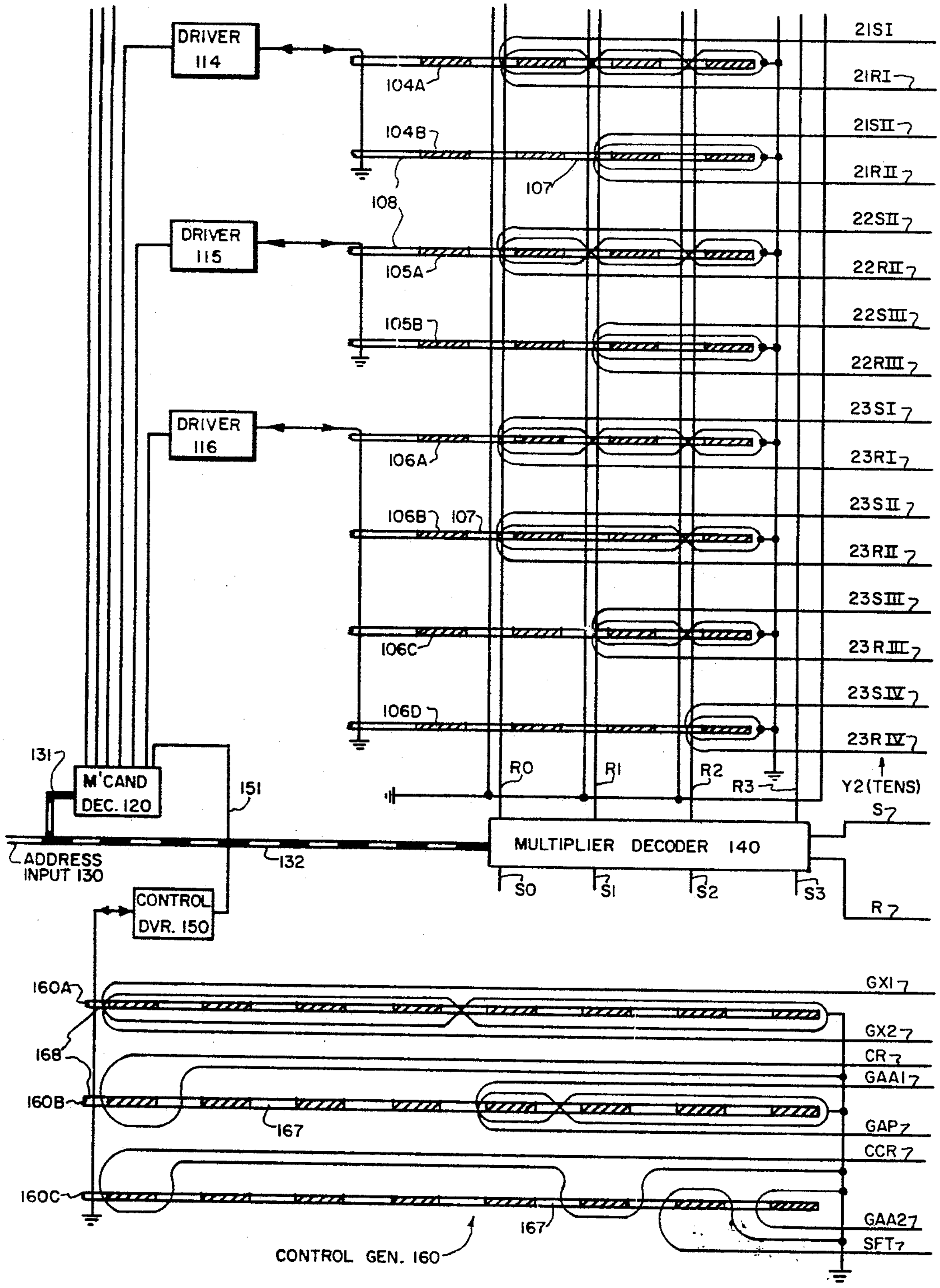
Figure 3C:
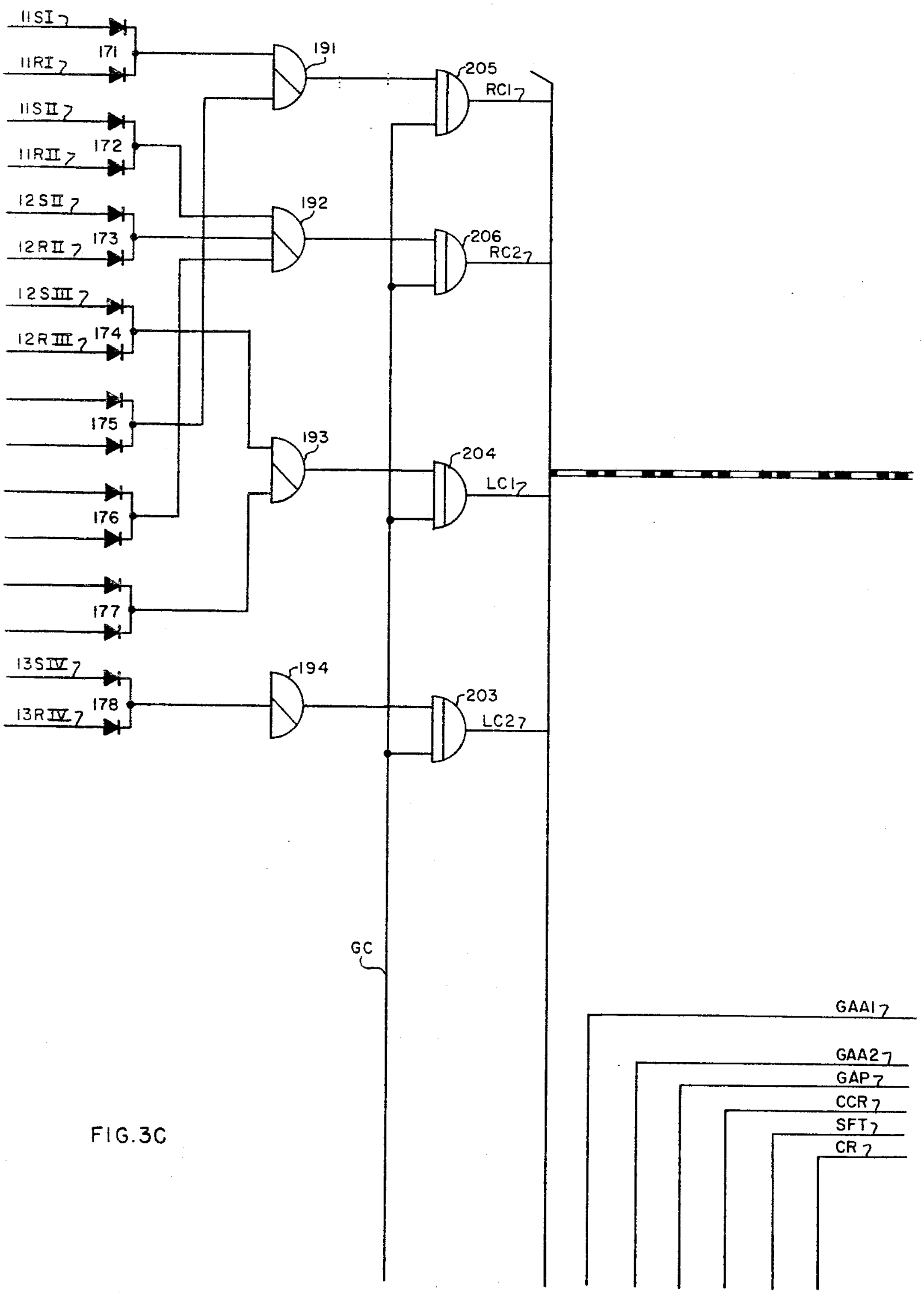
Figure 3D:
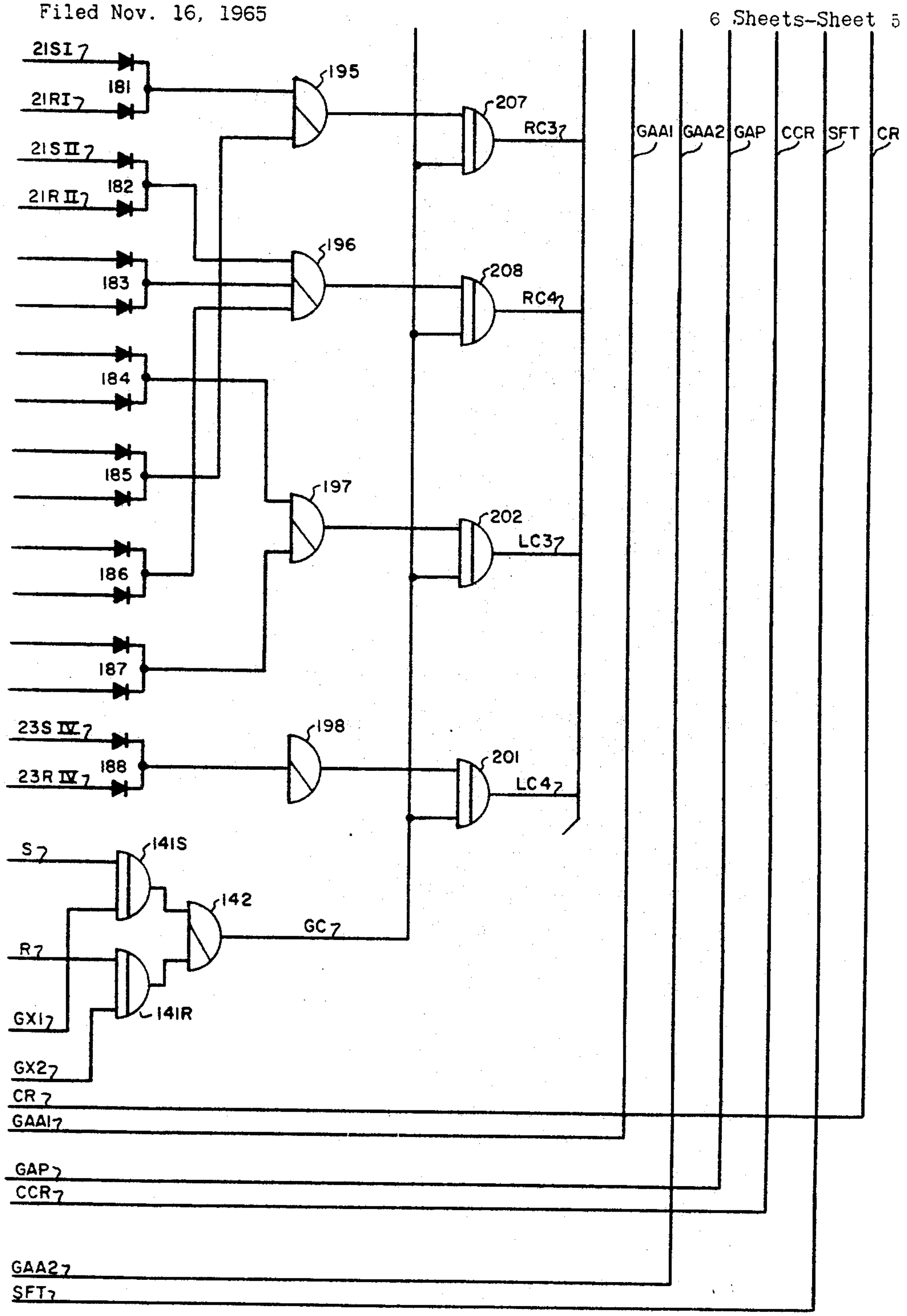
Figure 3E:
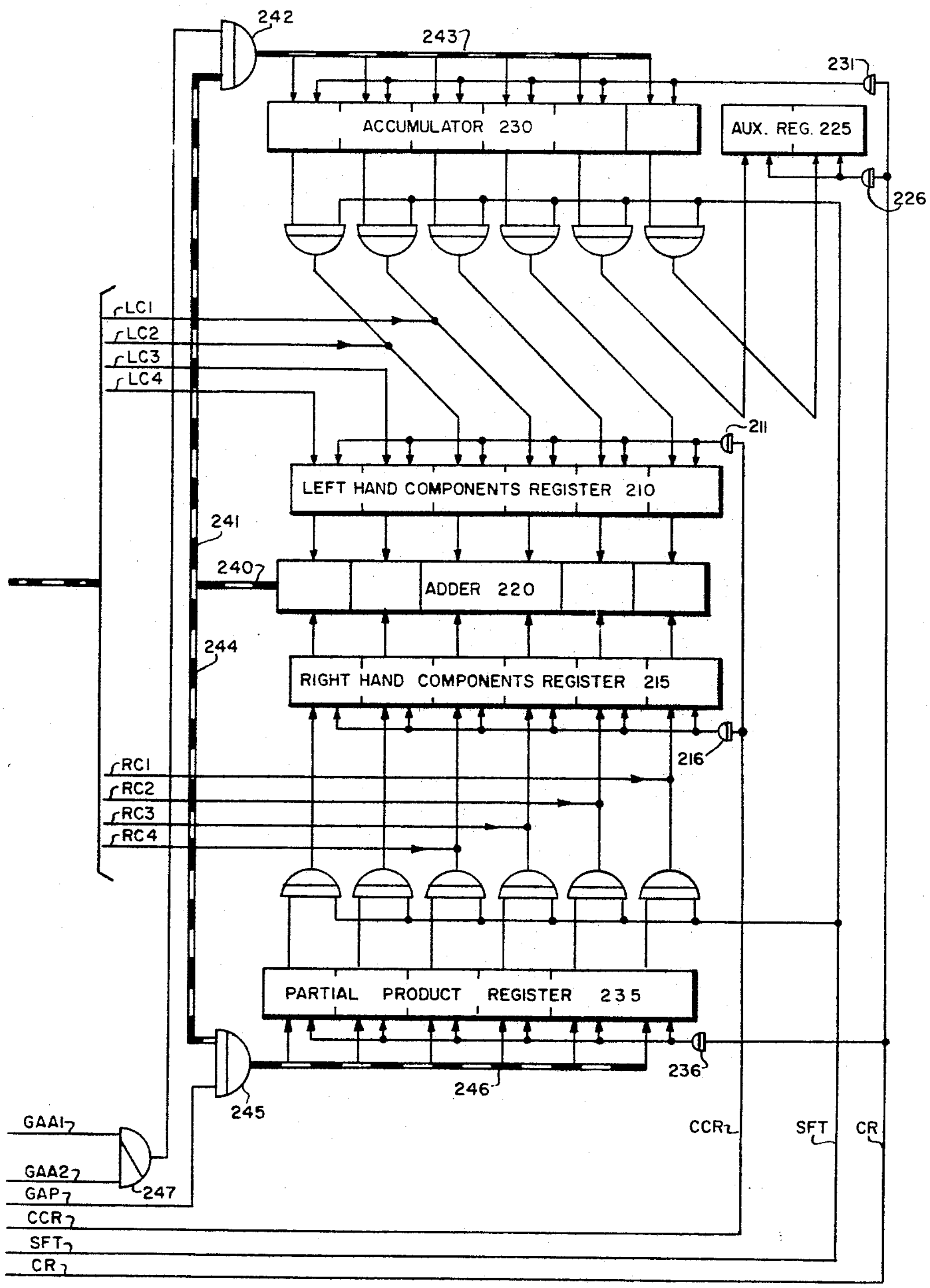

FIG. 5 is an output timing diagram of the control apparatus of FIG. 3E.

RIGHT-HAND AND LEFT-HAND COMPONENTS METHOD OF MULTIPLICATION

Multiplication of two decimal digits produces a two digit product. For example, 4×2=08, 6×2=12. Digits 0 and 1 are the left-hand components, 8 and 2 the right-hand components. In tabular form, multiplication of 467 by 32 is

| | |
|---|---|
| 467 | Multiplicand |
| 32 | Multiplier |
| 824 | Right-hand components for digit 2 |
| 011 | Left-hand components for digit 2 |
| 0934 | Partial product |
| 281 | Right-hand components for digit 3 |
| 112 | Left-hand components for digit 3 |
| 14944 | Product |

The disadvantages of the components method when implemented in a serial look-up table have already been pointed out. Implementation of a table employing myriaperture techniques avoids such difficulties and all component pairs of a multiplicand are produced simultaneously. Simultaneously, as used herein, means at substantially the same time when referring to "all" components because of series pulse train outputs. In an experimental model, the time of simultaneity (the time of a pulse train) was within the span of one microsecond. When referring to those components of a multiplicand with respect to a selected multiplier, the time span is more exact with reference to the same experimental model because of parallel outputs, about 250 nanoseconds. This series-parallel output sequence will become apparent below.

GENERAL DECRIPTION

FIG. 1 describes a multiplier arrangement comprising an address input 130, decoders 120 and 140, driver circuits 111–116, myriaperture bistable devices as a table store 100, control pulse generator 160 and an arithmetic unit 170.

Arithmetic unit 170 comprises left-hand component register 210, right-hand component register 215, adder 220, auxiliary register 225, accumulator 230 and partial product register 235. Various gating arrangements have not been specified in FIG. 1 but appear below in FIGS. 3A–3E.

Figure 2:
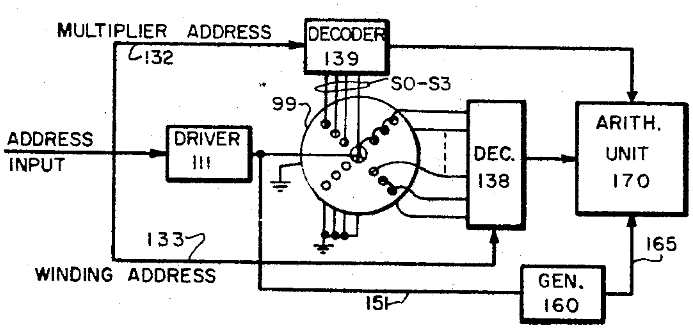
FIG. 2 is a schematic representation of another embodiment of the invention.

FIG. 2 describes another multiplying arrangement which is somewhat similar to that of FIG. 1. Disc 99 stores all components and selection is made of the storage windings by decoder 138, rather than by decoding a driver address. This type of driver is discussed in the United States patent application, "Computer Apparatus" of B. E. Briley, Ser. No. 485,153, filed Sept. 7, 1965, and assigned to the same assignee as the present invention. As far as the present invention is concerned each driver operates to set, then reset its associated disc in response to being accessed.

FIGS. 3A–3D describe in greater detail the apparatus of FIG. 1 comprising multiaperture discs 101–106 having a plurality of output windings 11SI–23RIV, S0–S3 and R0–R3, and control pulse generating disc 160 having output windings CR, GX1, GX2, CCR, GAA1, GAP, SFT and GAA2. Connecting the output windings 11SI–23RIV to the register apparatus are diode circuits 171–178 and 181–188 which function as OR gates, gates 191–198 and gates 201–208. Connecting the output windings R0–R3 and S0–S3 to control gates 201–208 are the decoder 150 output conductors S and R and gates 141S, 141R and 142. Control pulse outputs of generator disc 160 (i.e. GAP, GAA2) are coupled to the decoding and register apparatus via gates 141S, 141R, 216, 211, 226, 236, 231, 242 and 245. Gates 242 and 245 in this example each represent six gates, since elements 240, 241, 243, 244 and 246 are six bit buses for sake of simplicity.

FIG. 5 describes the timing of the control pulses generated by disc 160. FIG. 5 also describes the wiring of disc 160 since timing and wiring are so interrelated in this type of pulse generator. The above mentioned Briley application, Ser. No. 485,153 explains the design of such a generator in detail.

OPERATION OF MYRIAPERTURE DISCS

To enable the reader to understand the invention, a brief explanation of the operation of the myriaperture disc is offered. More detailed explanations may be found in the material referenced herein.

The myriaperture disc is a bistable magnetic element having a central aperture and a plurality of other apertures aligned along various annuli and/or radii of the disc, in this case alignment is radially outward of the central aperture. When a myriaperture disc is driven by a ramp current, a flux wave nucleates at the center of the disc and propagates outwardly therefrom at a uniform velocity, progressively switching the state of the disc as it goes. Therefore, a winding which links portions of the disc, via the apertures, will have a serial sequence of pulses generated therein indicative of the wiring or linkage pattern. Advantageously, the binary system may be employed, for example, a winding which links alternate sections of a disc will have a code of alternate "1's" and "0's" generated. The disc is reset in the same manner with the opposite polarity of drive current which again causes flux wave propagation from the center of the disc toward its periphery. Mirror windings were developed to make use of the "negative" signals during the reset time. Reference may be made to the above Briley application, Ser. No. 485,153 and to United States patent application "Magnetic Memory System Employing Myriaperture Devices," Ser. No. 421,749 filed Dec. 21, 1964, by B. E. Briley and assigned to the same assignee as the present invention.

RIGHT-HAND AND LEFT-HAND COMPONENT ENCODING OF MYRIAPERTURE DISCS

Many windings may be employed on each myriaperture disc to store information; therefore, the myriaperture disc may be advantageously employed as a table store of all multiplication components of each digit of a given group of digits.

The components multiplication method will be illustrated by means of a two digit binary coded radix 4 multiplication unit having multiplier digits X1, X2 and multiplicand digits Y1 and Y2 of possible digit values of 0, 1, 2 and 3. Multiples of zero are unnecessary to code, and multiples of 1, 2 and 3 are:

TABLE I

| 1 | | | | 2 | | | | 3 | | | | Land Area |
|---|---|---|---|---|---|---|---|---|---|---|---|---|
| Left | | Right | | Left | | Right | | Left | | Right | | |
| 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 1 | 1 | 1 |
| 0 | 0 | 1 | 0 | 0 | 1 | 0 | 0 | 0 | 1 | 1 | 0 | 2 |
| 0 | 0 | 1 | 1 | 0 | 1 | 1 | 0 | 1 | 0 | 0 | 1 | 3 |
| IV | III | II | I | IV | III | II | I | IV | III | II | I | |

where I, II, III and IV are winding designations to be used for designating the right-hand (I, II) and left-hand (III, IV) components, since all components of a multiplicand digit are to be available at the same time. The output terminals of the encoding windings as used herein will correspond to a code which designates the multiplicand digit (Y1 or Y2), the numerical value of the digit (0, 1, 2, 3), the set or reset operation time of the winding (S, R) and the winding table code (I, II, III, IV). For example, the reference 13SI indicates the Y1 digit is 3 and is with right-hand components encoded from the table winding code I on the winding which is operationally energized during setting of the associated disc, and 23RIV means that left-hand components encoding winding IV, a reset winding, has digit 3 encoded as the Y2 digit.

Multiplier digits are defined as "land" areas of a disc 0, 1, 2 and 3 outward of its center. Windings S0–S3 are energized in sequence during setting to define the X1 digit and winding R0–R3 are energized in sequence during resetting to define the X2 digit in accordance with the input address.

It should perhaps be noted that references such as 101A and 101B are actually the same disc shown separately for clarity of the windings. The illustration may be of the same or different radii.

OPERATIONAL DESCRIPTION

Referring to FIGS. 3A, 3B, 3C, 3D, 3E and 5, the multiplying arrangement operates as follows upon receipt of an input address on bus 130. The following example the address code will indicate the multiplication of 32×23 in binary coded radix-4.

*Example*

| | |
|---|---|
| 1110 | Multiplicand 32 |
| 1011 | Multiplier 23 |
| 0110 | Right-hand components |
| +1001 | Left-hand components |
| 101010 | First partial product |
| 1000 | Right-hand components |
| +0101 | Left-hand components |
| 011100 | Second partial product |
| + 101010 | First partial shifted |
| 10011010 | Product $2122_4$ |

The foregoing mathematical example may be referred to throughout the following operational description to compare the sequence of events and the various results obtained. Since the example discusses two digit numbers, only one set and reset, effectively two accesses, is required, the mirror windings being advantageously utilized.

A portion of the input address identifies the multiplicand Y1 and Y2 digits at decoder 120. According to the above example the Y1 (units) digit is 2 and the Y2 (tens) digit is 3; therefore discs 102 and 106 are driven by selected drivers 112 and 116, respectively, and progressively switched from one magnetic state to the opposite state producing right- and left-hand components on the windings of the following table.

TABLE II

| Y1 Digit (Digit 2) | | | | | Y2 Digit (Digit 3) | | | | |
|---|---|---|---|---|---|---|---|---|---|
| No. I Winding | 0 | 0 | 0 | $0_1$ | 23 SI | 0 | 1 | 0 | $1_2$ |
| 12SII | 0 | 1 | 0 | $1_2$ | 23S II | 0 | 1 | 1 | $0_4$ |
| 12SIII | 0 | 0 | 1 | $1_5$ | 23S III | 0 | 0 | 1 | $0_7$ |
| No. IV Winding | 0 | 0 | 0 | $0_6$ | 23S IV | 0 | 0 | 0 | $1_8$ |

These serial pulse trains are passed via gates 171–178, 181–188, 191–194 and 195–198 to gates 201–208 for selective parallel insertion into the register apparatus.

As the discs 102 and 106 are being switched, disc 160 is being switched via its driver 150 to provide control signals for the multiplier. The control pulse sequence is shown in FIG. 5. Many input configurations can be realized to operate driver 150; therefore assume that every input address at 130 contains an address for driver 150.

A second portion of the address identifies the X1 (units) digit, in this case digit 3, and couples winding S3 to gate 141S so that the land area corresponding to the digit 3 will be effective to energize conductor S and eventually GC to gate the components into their respective registers. FIG. 4 shows that control signal GX1 is generated during first four set time intervals: GX1, and S3 which is energized during the fourth interval to make S true, enable conductor GC via gates 141S and 142. GC true enables selected ones of gates 201–208.

Gates 191–198 steer the right- and left-hand components to gates 201–208, at which point serial pulse trains are yet present.

Referring to Table II, the components are determined on RC1–RC4 and LC1–LC4 as follows during the fourth set time interval. Right-hand components are the I, II windings and left-hand components are III, IV windings. Note—read units first then tens, read I before II and III before IV. Subscripts 1–4 indicate sequence of reading Table II or RC1–RC4 and subscripts 5–8 indicate sequence of reading for LC1–LC4 to obtain Table III.

TABLE III.—FIRST RIGHT-HAND AND LEFT-HAND COMPONENTS

| | | | |
|---|---|---|---|
| RC1 | 0 | LC1 | 1 |
| RC2 | 1 | LC2 | 0 |
| RC3 | 1 | LC3 | 0 |
| RC4 | 0 | LC4 | 1 |

Therefore codes 0110 and 1001 are the codes which will be registered in response to GC being true in the fourth set interval in registers 215 and 210, respectively. The remainder of the multiplier operation, with the exception of obtaining more components, deals with the manipulation of these codes between the various register equipment, therefore, reference should now be taken specifically to FIGS. 3E and 5.

The above operations were performed in the first four set time slots and only control pulse GX1 was considered. Looking back for a moment to the first time interval, we see that pulses CR and CCR were generated. Pulse CR clears (1) partial product register 235 via gate 236, (2) auxiliary register 225 via gate 226, and (3) accumulator 230 via gate 231. Pulse CCR clears component registers 210 and 215 via gates 211 and 216, respectively.

Returning to the fourth set interval, codes 0110 and 1001 are placed in registers 210, 215 and added to obtain code 101010. In the fifth set interval, pulse GAA1 places the first partial product in the accumulator by opening bus gate 242 and completing the path for buses 240, 241 and 243 to the accumulator.

Pulse CCR is again generated in the sixth set time slot to clear the component registers. All registers except the accumulator, are now clear.

Upon resetting of the discs, components will be registered with respect to the X2 multiplier digit, in the present example the digit 2 or winding R2 according to the decoded address on bus 132.

Since the multiplicand is still 32 we obtain Table IV like Table II for the mirror reset windings.

TABLE IV

| Y1 Digit (Digit 2) | | | | | Y2 Digit (Digit 3) | | | | |
|---|---|---|---|---|---|---|---|---|---|
| No. I Winding | 0 | 0 | 0 | $0_1$ | 23RI | 0 | 1 | 0 | $1_3$ |
| 12RII | 0 | 1 | 0 | $1_2$ | 23RII | 0 | 1 | 1 | $0_4$ |
| 12RIII | 0 | 0 | 1 | $1_5$ | 23RIII | 0 | 0 | 1 | $0_7$ |
| No. IV Winding | 0 | 0 | 0 | $0_6$ | 23RIV | 0 | 0 | 0 | $1_8$ |

Referring to the third interval (winding R2) of Table IV we obtain in Table V the second set of multiplication components.

TABLE V.—SECOND RIGHT-HAND AND LEFT-HAND COMPONENTS

| | | | |
|---|---|---|---|
| RC1 | 0 | LC1 | 1 |
| RC2 | 0 | LC2 | 0 |
| RC3 | 0 | LC3 | 1 |
| RC4 | 1 | LC4 | 0 |

Pulse GX2, effective during the first four reset intervals, coupled with energized winding R2 in the third interval, gates codes 1000 and 0101 into registers 215 and 210, respectively, where they are added by adder 220 to obtain the second partial product, code 011100.

Pulse GAP places the second partial product in partial product register 235 by opening bus gate 245 and coupling through buses 239 and 246.

In time position seven, pulse SFT effects (1) gating the second partial product 011100 into the right-hand components register 215, (2) shifting and gating the first partial product 101010 into the left-hand components register 210 and the auxiliary register 225, and as a result, adding of said two partial products.

Pulse GAA2 places the just-obtained portion of the product 100110 in the accumulator via buses 240, 241, 243 and gate 242, the remainder portion (10) being left in the auxiliary register 225.

Readout apparatus would of course be connected to the accumulator 230 and the auxiliary register 225.

Many variations of the described apparatus are evident to one skilled in the art. For example, an experimental model used four pole switches for the decoder 140; rotary switches and electronic decoding may be advantageously employed. In a model cross-coupled NAND gates were utilized for the register-type circuits, but any other form of bistable device could have been used. The embodiment according to FIG. 2, as may be easily understood, follows the principles set forth above. Many other changes and modifications may be made in the invention without departing from the true spirit and scope thereof and should be included in the appended claims.

What is claimed is:

1. Apparatus for multiplying two numbers, said apparatus comprising: means for combining multiplication components to provide a product; means storing the left-hand and right-hand multiplication components of each digit of a group of digits, said storage means including a plurality of bistable magnetic storage devices each corresponding to a separate one of said digits, and a plurality of component encoding windings, sets of said encoding windings selectively coupled to separate ones of said storage devices; means for selectively extracting signals from said storage means which are indicative of all multiplication components of a multiplicand which comprises at least one digit of said group, said extracting means including a plurality of drivers, each of said drivers being coupled to a separate one of said storage devices and operable to reverse the magnetic state of the corresponding device and energize the corresponding set of said encoding windings with signals which are indicative of the multiplication components of the corresponding digit; and means for selectively coupling to said component combining means the extracted component signals which correspond to a multiplier which comprises at least one digit of said group.

2. The apparatus according to claim 1, and further comprising a plurality of other windings each corresponding to a separate digit of said group and coupled to each of said magnetic storage devices, said other windings being energized in sequence with control signals upon magnetic state reversals of said storage devices, and wherein said selective coupling means includes first coupling means operated to couple said plurality of encoding windings to said component combining means, and second coupling means interposed between said first coupling means and said plurality of other windings and operated to couple the control signals of a selected one of said other windings to said first coupling means to control the operation thereof.

3. The multiplying apparatus as claimed in claim 1, wherein said selective coupling means comprises a plurality of other windings, each said other winding corresponding to a separate one of said digits, each said other winding coupled to each of said storage elements and energized by magnetic state reversals thereof, means operable to couple said encoding windings to said combining means, and means operated to selectively connect one of said other windings to said coupling means for controlling the operation thereof.

4. The apparatus according to claim 1, wherein each of said storage bistable magnetic storage devices includes a first aperture and a plurality of other apertures aligned therewith, each of said sets of encoding windings being selectively threaded through the apertures of a separate one of said elements to store the multiplication components of a corresponding digit, and wherein said extracting means includes a plurality of drivers, each of said drivers being individually coupled to a separate one of said elements and operable to reverse the magnetic state of its associated storage device progressively outwardly from said first aperture along said plurality of other apertures to energize each said encoding winding which threads the associated device with a sequence of component indicative signals.

5. The multiplying apparatus as claimed in claim 4, wherein said selective coupling means comprises means operable to couple said encoding windings to said component combining means, a plurality of second windings, each said second winding threading apertures of and coupled to each said storage element, said plurality of second windings sequentially energized by said progressive switching, and means operated to selectively couple a second winding to said coupling means to control the operation thereof.

6. Apparatus for multiplying two numbers, said apparatus comprising: means for combining multiplication components to produce a product; means storing the left-hand and right-hand multiplication components of each digit of a group of digits, said storage means including bistable magnetic storage means capable of being incrementally switched from one state to the other, and a plurality of conductors linked to said bistable storage means and energized with serial pulse trains upon incremental switching of said bistable storage means; means for selectively extracting pulses from said storage means which are indicative of all multiplication components of a multiplicand which comprises at least one digit of said group; and means for selectively coupling selected portions of said pulse trains to said combining means, said coupling means including means for providing said selected portions of said pulse trains in parallel, and said portions corresponding to a multiplier which comprises at least one digit of said group.

7. Apparatus for multiplying numbers, said apparatus comprising: means for combining multiplication components to provide a product; means for storing the left-hand and right-hand multiplication components of each digit of a group of digits, said storage means including at least one bistable magnetic storage device, a plurality of first windings coupled to said storage device, and a plurality of second windings coupled to said storage device; means for selectively extracting signals from said storage means which are indicative of all multiplication components of a multiplicand which comprises at least one digit of said group, said extracting means including means operated to incrementally reverse the magnetic state of said device to energize said second windings with serial pulse trains and to sequentially energize said first windings, and means operated to select certain ones of said second windings to be coupled to said combining means; and means for selectively coupling to said combining means the ones of said selectively extracted component signals which correspond to a multiplier which comprises at least one digit of said group, said selective coupling means including means for selecting one of said first windings and means operated in response to signals on a selected first winding to couple the selected ones of said second windings to said combining means.

References Cited

UNITED STATES PATENTS

| | | | |
|---|---|---|---|
| 3,055,586 | 9/1962 | Davis | 235—160 |
| 3,155,960 | 11/1964 | Bockemuehl | 340—174 |
| 3,243,599 | 3/1966 | McLane | 307—88 |

OTHER REFERENCES

R. K. RICHARDS, Arithmetic Operations in Digital Computers, 1955, pp. 247–250, W. Keister, A. E. Ritchie, S. H. Washburn, The Design of Switching Circuits, 1951, pp. 475–480.

MALCOLM A. MORRISON, *Primary Examiner.*

V. SIBER, *Assistant Examiner.*